ically-Arm
United States Patent

Hinton

[15] 3,635,840

[45] Jan. 18, 1972

[54] POLYMERIZATION CATALYST

[72] Inventor: Robert A. Hinton, Lawrence, Kans.

[73] Assignee: Phillips Petroleum Company

[22] Filed: Mar. 17, 1969

[21] Appl. No.: 807,931

[52] U.S. Cl. .................... 252/430, 260/88.2, 260/93.7, 260/94.9
[51] Int. Cl. ........................................................ C08d 3/04
[58] Field of Search ........................................ 252/428, 430

[56] References Cited

UNITED STATES PATENTS 3,351,623   11/1967   Walker et al. ...................... 252/430 X Primary Examiner—Patrick P. Garvin
Attorney—Young and Quigg

[57] ABSTRACT

A catalyst is prepared by calcining and thus coactivating with an oxygen-containing gas for a period of time to activate the same, to obtain disclosed results, the ingredients of a mass obtained by bringing together an organometal component, chromium oxide or a compound convertible by calcination to chromium oxide, in combination with at least one material selected from the group consisting of silica, alumina, zirconia, and thoria and a vanadium chelate component, e.g., vanadium acetylacetonate. The catalyst is suited to the polymerization of olefinic materials, especially 1-olefins and/or dienes to form polymers and copolymers, e.g., polyethylene.

The catalyst permits polymerization of an alpha olefin to produce polymers having a considerably lower melt index at constant conditions than that earlier obtained with a catalyst omitting the vanadium acetylacetonate and productivities per unit of catalyst which are considerably greater than those obtained when the vanadium acetylacetonate is not present during coactivation.

4 Claims, No Drawings

POLYMERIZATION CATALYST

This invention relates to the preparation of catalyst. It also relates to the production of polymers.

In one of its concepts the invention provides the preparation of a catalyst suitable for the polymerization of olefinic materials containing the coactivated mass obtained by bringing together an organoaluminum compound, e.g., a hydrocarbon aluminum compound, such as triethylaluminum and vanadium acetylacetonate upon a chromium oxide catalyst made with silica or its equivalent.

In another of its concepts the invention provides the polymerization of olefinic materials, e.g., olefins as disclosed in Hogan and Banks Pat. No. 2,825,721, granted Mar. 4, 1958. The disclosure of this patent is incorporated herein by reference. The olefins now preferred to polymerize are ethylene and mixtures of it with other monomers, e.g., a mixture of ethylene and butene-1 to produce as are known, ethylene-butene-copolymers. Conjugated dienes up to eight carbon atoms can also be polymerized with the catalyst of the invention.

In Walker and Czenkusch, Pat. No. 3,351,623, granted Nov. 7, 1967, there are described and claimed process and catalyst for polymerization of ethylene under polymerizing conditions with a catalyst which forms on mixing (1) an oxide component selected from the group consisting of silica, mixtures of silica and alumina containing up to 25 weight percent alumina, and mixtures of chromium oxide and at least one material selected from the group consisting of silica, alumina, zirconia, and thoria, at least part of the chromium being in the hexavalent state at the initial contacting of monomer therewith; (2) an organometal component of the formula $R_xM$ wherein $R$ is selected from the group consisting of hydrogen and alkyl, aryl, cycloalkyl, alkoxy radicals and combinations of these radicals containing up to 12 carbon atoms, at least one R group being a hydrocarbon radical, $M$ is selected from the group consisting of aluminum, gallium, indium, thallium, zinc, boron, lead, lithium, zirconium, cobalt, magnesium and tin, and $x$ is an integer equal to the valence of $M$; and (3) a vanadium component selected from the group consisting of vanadium chelates and vanadyl chelates of beta-diketones of the formula

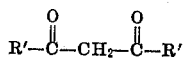

where each R' is individually selected from the group consisting of alkyl, aryl, and cycloalkyl radicals and combinations of said radicals, each R' containing up to 12 carbon atoms.

It will be noted in the patent just mentioned that its catalyst system has certain advantages over chromium oxide on silica with or without TEA. Thus, a polymer with a lower melt index is obtained with other conditions being constant. See the FIGURE in U.S. Pat. Ser. No. 3,351,623. The catalyst system of the patent permits production of 0.2 melt index polymer at a reaction temperature of about 308° F., whereas the system not having the vanadium component required a reactor temperature of about 280° F. The higher reaction temperature is desirable as it permits faster removal of heat from the reactor because of the greater ΔT between reactor contents and cooling water. This means a higher production rate—a very important factor in a commercial plant.

Further, it should be noted, for a better understanding of the nonobviousness of the presently claimed invention, that in the patent, col. 4, lines 10–22 and in the example, col. 4, lines 45–59, the activation is applied only to the believed formation of a reaction product which performs a useful function within the catalyst system and that the metal or chromium oxide and silica are alone activated prior to addition to the reactor of the catalytic adjuvants, namely, the V(AC)₃ and TEA (vanadium acetylacetonate and triethylaluminum, respectively).

I have now found that there are obtained highly advantageous results by admixing the components of the catalyst and then activating the entire mixture to the usual chromium oxide activation state. As the data here show, please see the example, the productivity of the catalyst at the now available higher reactor temperatures have been increased tremendously. Increases of over 100 percent and of well over 400 percent have been obtained. The importance of such productivities in commercial operation cannot be stressed too strongly. The higher reactive temperatures, as later more fully described, are advantageous from a viewpoint of heat transfer.

An object of the present invention is to provide a novel catalyst. Another object of the present invention is to provide a novel polymerization catalyst permitting higher polymerization reaction temperatures, and, therefore, higher polymerization reaction rates. A further object of the invention is to provide a polymerization process. A still further object of the invention is to provide a process for the polymerization of olefinic materials to produce useful products, e.g., 1-olefins to produce polymers and copolymers, more especially, normally solid materials.

According to the present invention there is provided a catalyst system which is the product of activation as in a current of air at usual activation conditions, of an admixture formed on mixing (1) a mixture of chromium oxide and at least one material selected from the group consisting of silica, alumina, zirconia, and thoria, at least part of the chromium being in the hexavalent state at the initial contacting of monomer therewith; (2) an organometal component of the formula $R_xM$ wherein $R$ is selected from the group consisting of hydrogen and alkyl, aryl, cycloalkyl, alkoxy radicals and combinations of these radicals containing up to 12 carbon atoms, at least one $R$ group being a hydrocarbon radical, $M$ is selected from the group consisting of aluminum, gallium, indium, thallium, zinc, boron, lead, lithium, zirconium, cobalt, magnesium and tin, and $x$ is an integer equal to the valence of $M$; and (3) a vanadium component selected from the group consisting of vanadium chelates and vanadyl chelates of beta-diketones of the formula

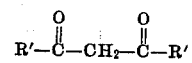

where each R' is individually selected from the group consisting of alkyl, aryl, and cycloalkyl radicals and combinations of said radicals, each R' containing up to 12 carbon atoms.

The oxide component of the catalyst preferably is a mixture of chromium oxide and at least one material selected from the group consisting of silica, alumina, zirconia, and thoria.

Preferably the mol ratio of vanadium compound to chromium is 0.1 to 10 and the mol ratio of organometal compound to vanadium compound is 0.1 to 30. Still preferably, the oxide component is silica and the mol ratio of vanadium compound to silica is 0.001 to 10 and the mol ratio of organometal compound to vanadium compound is 2 to 30.

The present invention is an improvement of the catalyst system of U.S. Pat. No. 3,351,623.

Also, according to the present invention there is provided a process for the polymerization and copolymerization of olefinic materials, for example, 1-olefins having up to, say, eight carbon atoms, and, preferably, no branching near the double bond then in the 4-position and/or dienes as described in U.S. Pat. No. 3,351,623 to produce useful products especially polymers and more specifically, solid polymers and copolymers. Conditions can be adjusted to produce softer and/or tacky materials if desired.

The proportions, ratios, conditions, etc. of U.S. Pat. No. 3,351,623 apply in this invention. Accordingly, it will be understood that considerable variation in the composition and treatment of the catalyst and in the polymerization conditions are possible.

EXAMPLE

A catalyst is prepared as follows and then used according to the operation of the prior art to produce solid polyethylene. Results are in the table.

1. 1.6 mols of TEA were blended with one mol of vanadium acetylacetonate in cyclohexane solution.

2. The above solution was used to impregnate chromium oxide catalyst to a vanadium concentration of 0.22 weight percent based on total catalyst mixture. The chromium oxide portion contained 0.66 weight percent Cr as $CrO_3$ on microspheroidal silica support.

3. The thus-impregnated catalyst had a V/Cr mol ratio of 0.32 and was activated by heating to 450° F. and passing air through it until a 0° F. dew point of the exit air was obtained. The catalyst was then heated to 1,050° F. and held at that temperature for 24 hours with air passing through it, said exit air again reaching a dew point of 0° F. after 24 hours.

The catalyst thus coactivated was used to polymerize ethylene in a continuous, 25-gallon stirred reactor. Cyclohexane was continuously passed to the reactor at a rate to produce a 25 weight percent concentration of polyethylene in solution in the reactor. Ethylene and the coactivated catalyst were also passed to the reactor. Some additional TEA in cyclohexane solution was separately and continuously passed to the reactor. For comparison the catalyst system was used as taught by U.S. Pat. No. 3,351,623, i.e., activated chromium oxide, TEA in cyclohexane solution, and vanadium acetylacetonate were separately passed to the reactor. The results:

|  | Prior art | Invention | |
|---|---|---|---|
|  |  | Test 1 | Test 2 [1] |
| 1. Catalyst mol ratio prior to calcination: |  |  |  |
| (a) TEA/VA | 0 | 1.6 | 1.6 |
| (b) V/Cr | 0.50 | 0.30 | 0.70 |
| 2. TEA added to reactor during polymerization, lb./1,000 lb. polymer produced | 20.09 | [3] 0.0345 | [3] 0.077 |
| 3. Reactor temperature, ° F | 313 | 293 | 299 |
| 4. Reactor residence time, hrs | 1.7 | 1.9 | 1.9 |
| 5. Polymer melt index | 0.20 | 0.17 | 0.18 |
| 6. Polymer density | 0.954 | 0.958 | 0.957 |
| 7. Catalyst productivity, lb. polymer/lb. catalyst | 1,100 | 5,000 | 2,400 |

[1] Calcined as for test 1.
[2] The only TEA added was in cyclohexane solution during polymerization.
[3] This is TEA in cyclohexane solution added to the reactor during polymerization. Note that this is in addition to that used to impregnate the chromium oxide catalyst prior to activation.

It is seen from the foregoing that there is essential merit in the calcination of the entire mass of the catalyst components as noted in particular by the 2-to-5-fold increase in catalyst productivity. This means appreciably less catalyst can be used in producing a given quantity of polymer product, thus saving catalyst costs. In addition, cost of removing spent catalyst from the polymer product is greatly reduced.

The calcination is conducted by passing an oxygen-containing gas through the catalyst at a temperature of approximate range of 500° F. to 1,500° F. preferably 750° F. to 1,300° F. The gas must contain oxygen and thus can consist of air or a mixture of oxygen and other inert gases such as nitrogen, carbon dioxide, argon, helium, etc. The gas should have a low water content, preferably with a dew point below 0° F. The calcination is carried out until the dew point of the effluent gas from the calciner has dropped below about 0° F. This may require from 12 to 100 hours, depending on the calcination temperature used.

It is now believed that the coactivation step producing a vanadium-aluminum complex or compound. During the polymerization step the vanadium-aluminum compound produces a high molecular weight polyethylene whereas the chromium oxide produce a polyethylene with a lower molecular weight.

When polymerizing 1-olefins as herein described, it is sometimes preferred to have the chromium oxide in the catalyst initially, at least in part in hexavalent state.

The disclosure of U.S. Pat. No. 3,351,623, above-mentioned, is incorporated herein by reference.

Reasonable variation and modification are possible within the scope of the foregoing disclosure and the appended claims to the invention the essence of which is that there has been provided a catalyst, as described, in which all of the essential components are coactivated, also as described, and that there has been provided a polymerization process for polymerizing olefinic materials, also as described, to produce hitherto unobvious yields of product per unit of catalyst employed.

I claim:

1. An improved catalyst which is prepared from a mixture formed on mixing (1) a mixture of chromium oxide and at least one material selected from the group consisting of silica, alumina, zirconia, and thoria, at least part of the chromium being in the hexavalent state at the initial contacting of monomer therewith; (2) an organometal component of the formula $R_xM$ wherein $R$ is selected from the group consisting of hydrogen, alkyl, aryl, cycloalkyl, alkoxy radicals and combinations of these radicals containing up to 12 carbon atoms, at least one $R$ group being a hydrocarbon radical, $M$ is selected from the group consisting of aluminum, gallium, indium, thallium, zinc, boron, lead, lithium, zirconium, cobalt, magnesium and tin, and $x$ is an integer equal to the valence of $M$; and (3) a vanadium component selected from the group consisting of vanadium chelates and vanadyl chelates of beta-diketones of the formula

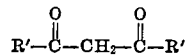

where each $R'$ is individually selected from the group consisting of alkyl, aryl, cycloalkyl radicals and combinations of said radicals, each $R'$ containing up to 12 carbon atoms, said components upon admixture being coactivated under coactivation conditions including heating said admixture in an oxygen-containing gas at a coactivation temperature for a time sufficient to render the mass catalytic in character, as for the polymerization of olefinic materials, said conditions including the following: a mol ratio of the vanadium compound to chromium of 0.1 to 10, a mol ratio of organometal compound to vanadium compound of 0.1 to 30, a mol ratio of vanadium compound to said selected material of 0.001 to 10 and passing said oxygen-containing gas through said admixture at a temperature in the approximate range of 500° F. to 1,500° F. until the dew point of the effluent gas from the coactivation has dropped below approximately 0° F.

2. A process for preparing an improved catalyst suitable for the polymerization of an olefinic material which comprises forming a mixture of chromium oxide and at least one material selected from the group consisting of silica, alumina, zirconia, and thoria, at least part of the chromium being in the hexavalent state at the initial contacting of monomer therewith, an organometal component of the formula $R_xM$ wherein $R$ is selected from the group consisting of hydrogen alkyl, aryl, cycloalkyl, alkoxy radicals and combinations of these radicals containing up to 12 carbon atoms, at least one $R$ group being a hydrocarbon radical, $M$ is selected from the group consisting of aluminum, gallium, indium, thallium zinc, boron, lead, lithium, zirconium, cobalt, magnesium and tin, and $x$ is an integer equal to the valence of $M$, and a vanadium component selected from the group consisting of vanadium chelates and vanadyl chelates of beta-diketones of the formula

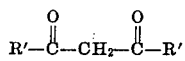

where each $R'$ is individually selected from the group consisting of alkyl, aryl, cycloalkyl radicals and combinations of said radicals, each $R'$ containing up to 12 carbon atoms, and then coactivating the admixture thus formed under coactivation conditions, including heating said admixture in an oxygen-containing gas at a coactivation temperature for a time sufficient to render the mass catalytic in character, said conditions including the following: a mol ratio of the vanadium compound to chromium of 0.1 to 10, a mol ratio of organometal compound to vanadium compound of 0.1 to 30, a mol ratio of vanadium compound to said selected material of 0.001 to 10 and passing said oxygen-containing gas through said admixture at a temperature in the approximate range of 500° F. to 1,500° F. until the dew point of the effluent gas from the coactivation has dropped below approximately 0° F.

3. A process for the preparation of a catalyst according to claim 2 wherein the mol ratio of organometal compound to vanadium compound is 2 to 30.

4. A process for the preparation of a catalyst according to claim 2 wherein the admixture is formed on mixing together (1) chromium oxide associated with at least one oxide selected from the group consisting of silica, alumina, zirconia, and thoria at least a portion of the chromium being in the hexavalent state at the initial contacting of olefinic therewith, (2) vanadium acetylacetonate, and (3) triethylaluminum.

* * * * *